(12) United States Patent
McCorkle et al.

(10) Patent No.: US 9,112,592 B2
(45) Date of Patent: Aug. 18, 2015

(54) SYSTEM AND METHOD FOR CHIRP-BASED TRANSMISSION

(76) Inventors: John W McCorkle, Vienna, VA (US); Timothy R Miller, Arlington, VA (US)

( * ) Notice: Subject to any disclaimer, the term of this patent is extended or adjusted under 35 U.S.C. 154(b) by 458 days.

(21) Appl. No.: 13/486,842

(22) Filed: Jun. 1, 2012

(65) Prior Publication Data

US 2012/0314730 A1   Dec. 13, 2012

Related U.S. Application Data

(60) Provisional application No. 61/492,392, filed on Jun. 2, 2011.

(51) Int. Cl.
*H04B 1/69* (2011.01)
*H04L 27/10* (2006.01)

(52) U.S. Cl.
CPC .............. *H04B 1/69* (2013.01); *H04L 27/103* (2013.01); *H04B 2001/6912* (2013.01)

(58) Field of Classification Search
CPC .................... H04B 1/69; H04B 2001/6912

USPC .......................................... 375/130, 139, 295
See application file for complete search history.

(56) References Cited

U.S. PATENT DOCUMENTS

2002/0009125 A1*   1/2002   Shi ................................ 375/139
2006/0280227 A1*   12/2006  Pinkney ........................ 375/139

\* cited by examiner

*Primary Examiner* — Kevin M Burd
(74) *Attorney, Agent, or Firm* — Posz Law Group, PLC

(57) ABSTRACT

An electromagnetic transmission system is provided, comprising: M chirp generators, each operating at a first frequency, each of the M chirp generators being configured to generate an $i^{th}$ digital chirp portion comprising $(1/M)^{th}$ of a digital chirp signal having a set ramp rate; a parallel-in serial-out register configured to receive the M digital chip portions in parallel at the first frequency, and configured to output the M digital chip portions in series as the digital chirp signal at a second frequency; and a digital-to-analog converter operating at the second frequency and configured to convert the digital chirp signal into an analog chirp signal, wherein i is an index that goes from 1 to M, and wherein the second frequency is M times the first frequency.

13 Claims, 6 Drawing Sheets

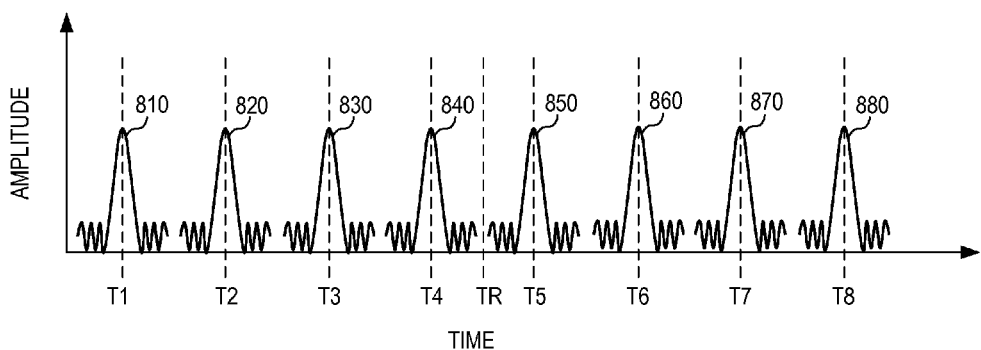
FIG. 8
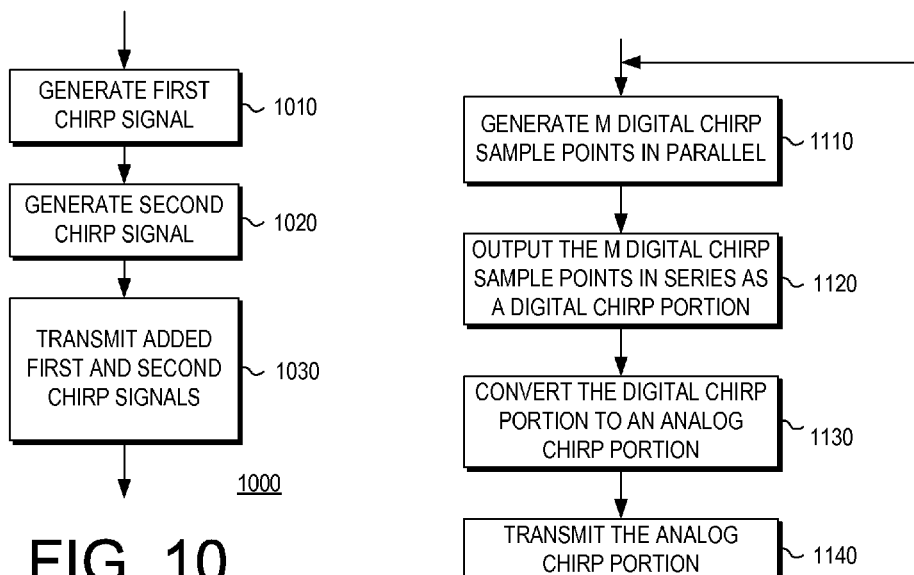
FIG. 10
FIG. 11

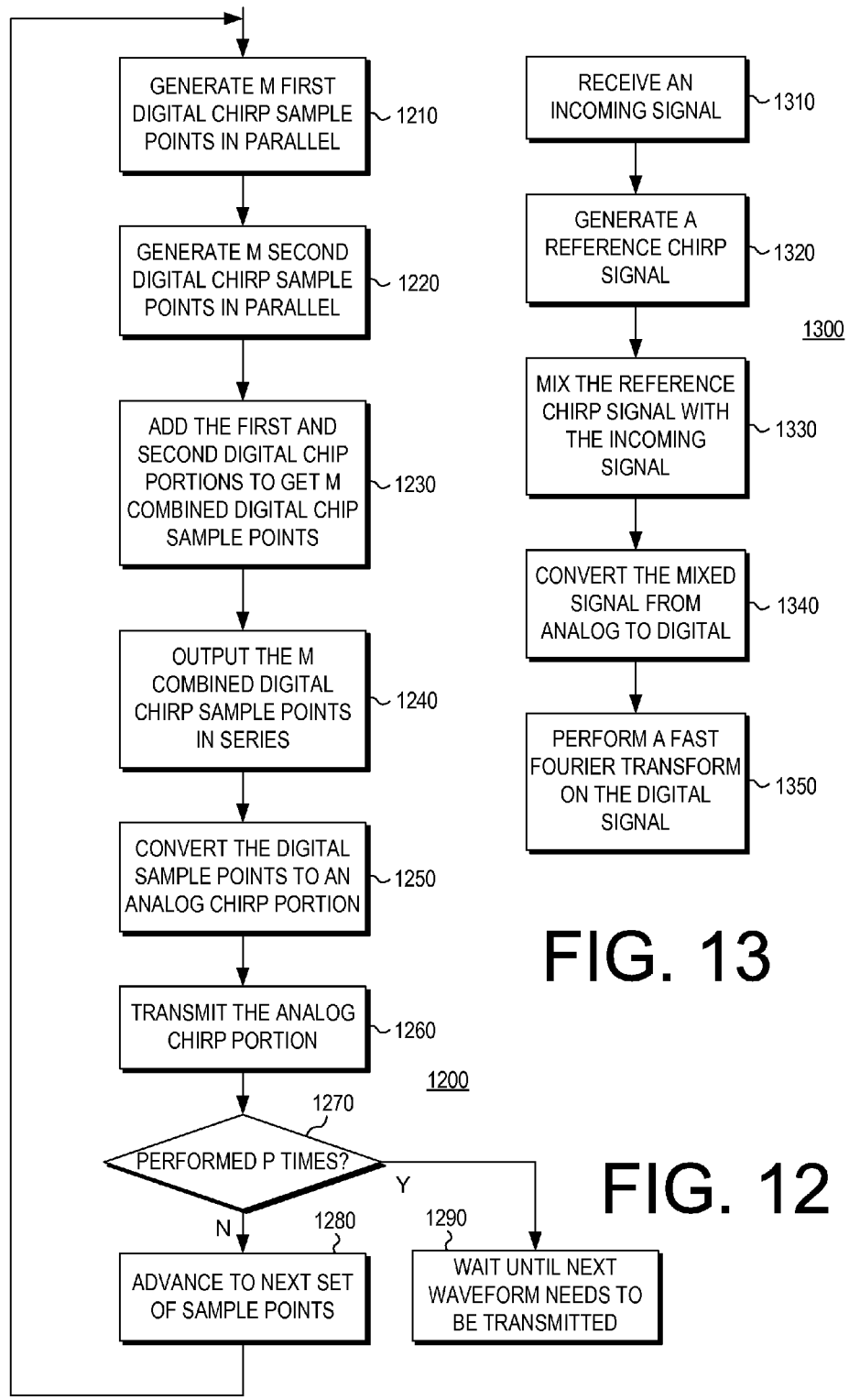

SYSTEM AND METHOD FOR CHIRP-BASED TRANSMISSION

CROSS-REFERENCE TO RELATED APPLICATIONS

This application claims priority from provisional application 61/492,392, filed on 2 Jun. 2011, titled "MULTI-FUNCTION RF SYSTEM," the contents of which are incorporated by reference in their entirety.

FIELD OF THE INVENTION

This application relates to a system and method for generating, sending, and receiving chirp signals. More particularly it relates to a system and method for generating, sending and receiving chirp signals or stacked chirp signals for the purpose of data communication.

BACKGROUND OF THE INVENTION

In transmitting data, the data to be transmitted must generally be modulated onto some kind of transmission signal. Although many options exist, one possible transmission signal for use with data modulation is a chirp signal. A chirp signal is a short duration signal whose frequency increases or decreases with time. If its frequency increases, the chirp signal is called an up-chirp; and if its frequency decreases, the chirp signal is called a down-chirp. The rate at which the frequency changes over time is called the chirp's ramp rate. Chirp signals can also be called sweep signals.

Chirp signals can vary their frequency and numerous ways. However, two common types of chirp signals are linear chirps, in which the frequency of the chirp signal increases in a linear fashion, and exponential chirps in which the frequency of the chirp signal increases in an exponential fashion.

A linear chirp can be described in the frequency domain according to equation (1):

$$f(t) = f_0 + rt \quad (1)$$

where $f_0$ is a starting frequency at a time t=0, and r is the linear ramp rate.

A linear chirp can be described in the time domain according to equation (2):

$$x(t) = \sin\left[2\pi \int_0^t f(t')dt'\right] \quad (2)$$
$$= \sin\left[2\pi \int_0^t (f_0 + rt')dt'\right]$$
$$= \sin\left[2\pi\left(f_0 t + \frac{rt^2}{2}\right)\right]$$

An exponential chirp can be described in the frequency domain according to equation (4):

$$f(t) = f_0 r^t \quad (3)$$

where $f_0$ is a starting frequency at a time t=0, and $r^t$ is the exponential ramp rate.

$$x(t) = \sin\left[2\pi \int_0^t f(t')dt'\right] \quad (4)$$
$$= \sin\left[2\pi \cdot f_0 \int_0^t (r^{t'})dt'\right]$$
$$= \sin\left[2\pi \cdot f_0\left(\frac{r^t - 1}{\ln(r)}\right)\right]$$

In each case, the chirp signal will include both the fundamental frequency described by the above equations, as well as accompanying harmonics.

Chirp signals are used commonly in radar and sonar applications. Therefore, there are many systems in existence for sending, receiving, and otherwise manipulating chirps. As a result, it is very relatively straightforward to design a system in which data is modulated onto a chirp. Furthermore, this makes it possible to reuse both a processor and processing resources for both radar and communication functions. It can also take advantage of the radar to provide synchronization and EQ training for communications.

In addition, chirp signals can be used that have a very low peak-two-average ratio (PAR), which can minimize required supply voltages, allow for the use of smaller and more efficient transistors than higher voltage signals.

However, data throughput is always an issue with any data transmission system. It is generally desirable to pass the greatest amount of data in the shortest time possible. As a result, it would be desirable to provide a chirp-based system in which multiple bits of data could be transmitted at the same time.

SUMMARY OF THE INVENTION

An electromagnetic transmission system is provided, comprising: M chirp generators, each operating at a first frequency, each of the M chirp generators being configured to generate P digital chirp sample points comprising (1/M)th of a digital chirp signal having a set ramp rate; a parallel-in serial-out register configured to receive the M digital chip portions in parallel at the first frequency, and configured to output the M digital chip portions in series as the digital chirp signal at a second frequency; and a digital-to-analog converter operating at the second frequency and configured to convert the digital chirp signal into an analog chirp signal. M and P are integers greater than 1, and the second frequency is M times the first frequency.

The electromagnetic transmission system may further comprise: an antenna configured to transmit the analog chirp signal.

The chirp signal may be modulated with data. The modulation may be one of BPSK, QPSK, or QAM encoding.

An electromagnetic transmission system is provided, comprising: M first chirp generators, each operating at a first frequency, each of the M first chirp generators being configured to generate an $i^{th}$ first digital chirp portion comprising $(1/M)^{th}$ of a first digital chirp signal having a first ramp rate; M second chirp generators, each operating at the first frequency, each of the M second chirp generators being configured to generate an $i^{th}$ second digital chirp portion comprising (1/M)$^{th}$ of a second digital chirp signal having a second ramp rate and a second starting frequency;

M adders, each configured to add the $i^{th}$ first digital chirp portion to the $i^{th}$ second digital chirp portion to generate an $i^{th}$ combined digital chirp portion;

a parallel-in serial-out register configured to receive the M combined digital chip portions in parallel at the first frequency, and configured to output the M combined digital chip portions in series as a combined digital chirp portion signal at a second frequency; and a digital-to-analog converter operating at the second frequency and configured to convert the combined digital chirp signal portion into a combined analog chirp signal portion, M is an integer greater than 1, i is an index that goes from 1 to M, the second frequency is M times the first frequency, and the first chirp signal and the second chirp signal are orthogonal or nominally orthogonal.

The second ramp rate may be different from the first ramp rate; and the second starting frequency may be different from the first starting frequency.

The electromagnetic transmission system may further comprise: an antenna configured to transmit the combined analog chirp signal portion.

The first chirp signal may be modulated with first data, and the second chirp signal may be modulated with second data. The first and second chirp signals may be modulated using one of BPSK, QPSK, or QAM encoding.

An electromagnetic receiver system is provided, comprising: a receiver circuit configured to receive an electromagnetic signal as a received signal; a first chirp generator configured to generate a chirp signal having a set ramp rate; a mixer configured to mix the chirp signal and the received signal to generate an analog mixed signal; an analog-to-digital converter configured to convert the analog mixed signal to a digital mixed signal; and a fast Fourier transform circuit configured to perform a fast Fourier transform onto the digital mixed signal to generate a recovered signal.

The electromagnetic receiver system may further comprise: an OFDM receiver circuit configured to perform OFDM decryption on the recovered signal. The receiver circuit may comprise an antenna.

A method of generating an electromagnetic signal is provided, comprising: generating a first chirp signal having a first frequency range; generating a second chirp signal having a second frequency range different from the first frequency range; and transmitting the first and second chirp signals such that the first chirp signal is interleaved in time with the second chirp signal, wherein the first chirp signal and the second chirp signal are orthogonal or nominally orthogonal.

A method of generating an electromagnetic signal is provided, comprising: generating M first digital chirp portions at a first frequency, each of the M first digital chirp portions comprising P sample points that make up $(1/M)^{th}$ of a first digital chirp signal having a first ramp rate and a first starting frequency; generating M second digital chirp portion at the first frequency, each of the M second digital chirp portions comprising P sample points that make up $(1/M)^{th}$ of a second digital chirp signal having a second ramp rate and a second starting frequency; adding corresponding first digital chirp portions to corresponding second digital chirp portions to generate M combined digital chirp portions at the first frequency; outputting the M combined digital chip portions in series as a combined digital chirp signal portion at a second frequency; and converting the combined digital chirp signal portion into a combined analog chirp signal portion, wherein P and M are integers greater than 1, wherein the second frequency is M times the first frequency, and wherein the first chirp signal and the second chirp signal are orthogonal or nominally orthogonal.

The second ramp rate may be different from the first ramp rate; and the second starting frequency may be different from the first starting frequency.

The method may further comprise: modulating the first chirp signal with first data, and modulating the second chirp signal with second data. The first and second chirp signals may be modulated using one of BPSK, QPSK, or QAM encoding.

A method of processing a wireless electromagnetic signal is provided, comprising: receiving the wireless electromagnetic signal; generating a first local chirp signal having a first ramp rate; mixing the received wireless electromagnetic signal with the first local chirp signal to obtain a first mixed signal; and digitally demodulating the first mixed signal to generate a first demodulated signal.

The method may further comprise: generating a second local chirp signal having a second ramp rate; mixing the received wireless electromagnetic signal with the second local chirp signal to obtain a second mixed signal; and digitally demodulating the second mixed signal to generate a second demodulated signal, wherein the first chirp signal and the second chirp signal are orthogonal or nominally orthogonal.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

FIG. 8 is a graph of the stacked chirp signal in the time domain according to disclosed embodiments;

FIG. 10 is a flow chart of a method of generating overlapping chirp signals according to disclosed embodiments;

FIG. 11 is a flow chart of method of generating a chirp signal according to disclosed embodiments;

FIG. 12 is a flow chart of a method of generating overlapping chirp signals according to alternate disclosed embodiments; and FIG. 13 is a flow chart of a method of receiving overlapping chirp signals according to disclosed embodiments.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, may be supported with or in integrated circuits (ICs), such as dynamic random access memory (DRAM) devices, static random access memory (SRAM) devices, or the like. In particular, they may be implemented using CMOS transistors. It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present invention, further discussion of such ICs will be limited to the essentials with respect to the principles and concepts used by the exemplary embodiments.

Chirp Signals

A data transmission system is provided that passes data through multiple chirp signals that are transmitted at the same time. These multiple chirp signals are chosen to have ramp rates that make the signals orthogonal or nominally orthogonal with respect to each other. Two chirp signals are orthogonal when their cross-correlation is zero; and two chirp signals are nominally orthogonal when their cross-correlation is small enough that it can be discounted during processing.

Figure 1:
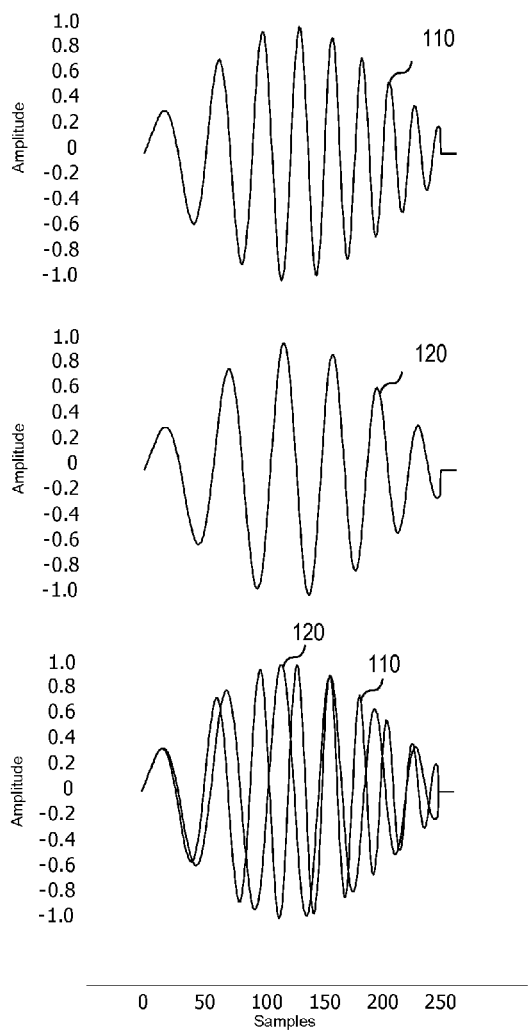
FIG. 1 is a graph of chirp signals according to disclosed embodiments.

FIG. 1 is a graph of chirp signals according to disclosed embodiments. As shown in FIG. 1, two chirp signals are provided: a first chirp signal 110 and a second chirp signal 120. These two signals are shown with normalized amplitudes, and an indication of the number of samples required to generate these chirp signals 110, 120 as digital chirp signals.

FIG. 1 also shows the first and second chirp signals 110, 120 overlapping, which indicates that they have the same envelope, but different ramp rates.

Figure 2:
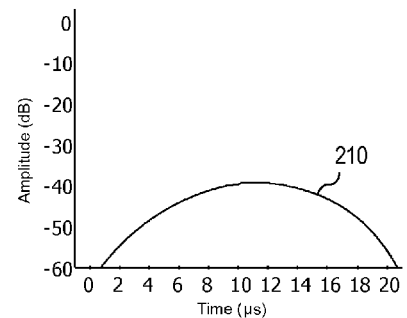
FIG. 2 is a graph of the cross-correlation of the chirp signals of FIG. 1 according to disclosed embodiments.

FIG. 2 is a graph of the cross-correlation of the chirp signals 110, 120 of FIG. 1 according to disclosed embodiments. Cross-correlation is when two different signals are mixed (e.g., the first chirp signal 110 and the second chirp signal 120). As shown in FIG. 2, the cross-correlation of the first and second chirp signals 110, 120 is −40 dB or lower, which indicates that the first and second chirp signals 110, 120 are nominally orthogonal.

Because the first chirp signal 110 and the second chirp signal 120 are nominally orthogonal, they can both be transmitted at the same time without causing an undesirable level of interference. Even if a receiver designed to receive the first chirp signal 110 receives the second chirp signal 120, the low cross-correlation will result in minimal interference with the reception of first chirp signals 110.

Figure 3:
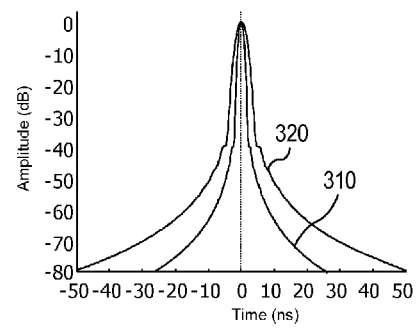
FIG. 3 is a graph of the auto-correlation of the chirp signals of FIG. 1 according to disclosed embodiments.

FIG. 3 is a graph of the auto-correlation of the chirp signals 110, 120 of FIG. 1 according to disclosed embodiments. Autocorrelation is when two of the same signal are mixed (e.g., the first chirp signal 110 mixed itself). As shown in FIG. 3, a first autocorrelation 310 indicates the autocorrelation of the first chirp signal 110, and the second autocorrelation 320 indicates the autocorrelation of the second chirp signal 120.

As indicated in FIG. 3, the autocorrelation for both the first chirp signal 110 and the second chirp signal 120 is very good. Both autocorrelation signals 310, 320 are at 0 dB with a zero time difference between signals, and both drop off rapidly as the chirp signals 110, 120 drift apart in phase. This allows a receiver to easily determine when a chirp signal has been properly received.

In order to pass an acceptable amount of data, it is necessary to generate chirp signals at very high frequencies (e.g., in the gigahertz range). However, operating circuits at high frequency can be both difficult and costly. Therefore, it is desirable to minimize the number of circuit elements that operate at high frequencies.

Chirp Generator

Figure 4:
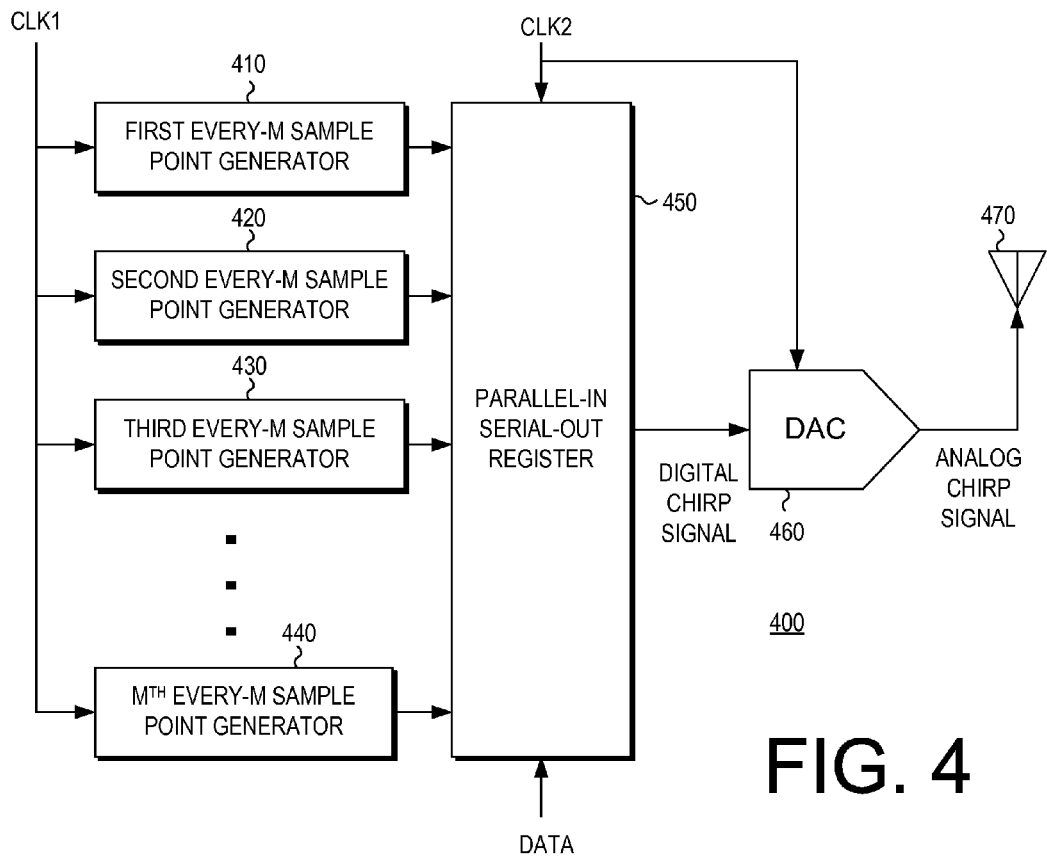
FIG. 4 is a block diagram of a chirp generation circuit according to disclosed embodiments.

FIG. 4 is a block diagram of a chirp generation circuit 400 according to disclosed embodiments. As shown in FIG. 4, a chirp generation circuit 400 includes a first every-M sample point generator 410, a second every-M sample point generator 420, a third every-M sample point generator 430, through an $M^{th}$ every-M sample point generator 440, a parallel-in serial-out register 450, a digital-to-analog converter (DAC) 460, and an antenna 470.

Each of the a first through $M^{th}$ every-M sample point generators 410, 420, 430, 440 receives a first clock signal CLK1 having a first clock frequency, and operates to generate sample points for $(1/M)^{th}$ of a digital chirp signal. Each every-M sample point generator 410, 420, 430, 440 generates every $M^{th}$ sample in a digital chirp signal, each starting at a different start point. For example, in the disclosed embodiment, the first every-M sample point generator 410 generates samples 0, M, 2M, 3M, etc.; the second every-M sample point generator 420 generates samples 1, M+1, 2M+1, 3M+1, etc.; the third every-M sample point generator 430 generates samples 2, M+2, 2M+2, 3M+2, etc.; up until the $M^{th}$ every-M sample point generator 440 generates samples M−1, 2M−1, 3M−1, etc. In this way, all of the samples required to make a digital chirp signal are generated by the first through $M^{th}$ every-M sample point generators 410, 420, 430, 440.

The every-M sample point generators 410, 420, 430, 440 can be implemented in a variety of ways. However, one way is to have each every-M sample point generator 410, 420, 430, 440 include a lookup table containing sample values that make up their respective portion of the total chirp signal. The lookup table then operates based on the first clock signal CLK1 to output the contents of the associated lookup table at a frequency set by the first clock signal CLK1.

Alternate embodiments could have every-M sample point generators that operate to calculate the samples of the chirp signal portions transmitted, or have every-M sample point generators that include local oscillators that are sampled at appropriate times.

The parallel-in serial-out register 450 receives a second clock signal CLK2 having a second clock frequency, and operates to receive the outputs of the first through $M^{th}$ every-M sample point generators 410, 420, 430, 440 in parallel at the first frequency, and output them in series at a second frequency. The output of the parallel-in serial-out register 450 is therefore the complete digital chirp signal.

The parallel-in serial-out register 450 also receives data to be modulated and modulates the received chirp samples so as to properly modulate the resulting digital chirp signal with the data to be transmitted. This modulation can be binary phase shift keying (BPSK) modulation, quadrature phase shift keying (QPSK) modulation, quadrature amplitude modulation (QAM), or any desirable modulation scheme. In alternate embodiments, the modulation can take place in the every-M sample point generators 410, 420, 430, 440, or in a separate circuit between the parallel-in serial-out register 450 and the digital-to-analog converter 460.

The DAC 460 also receives the second clock signal CLK2 and operates to take the digital chirp signal output from the parallel-in serial-out register 450 and convert it into an analog chirp signal.

The antenna 470 then operates to transmit the analog chirp signal.

Although not shown, this circuit can have additional back end processing between the DAC 460 and the antenna 470, prior to transmission In the embodiment shown in FIG. 4, the frequency of the second clock signal CLK2 must be at least M times the frequency of the first clock signal CLK1. For example, if M=16, the second clock signal CLK2 may operate at 4 GHz, while the first clock signal CLK1 may operate at 250 MHz. This allows the first through $M^{th}$ every-M sample point generators 410, 420, 430, 440 to operate at a much lower speed allowing for the use of cheaper components that consume less power.

It should also be noted that the samples provided by the first through $M^{th}$ every-M sample point generators 410, 420, 430, 440 should nevertheless meet the Nyquist sampling rate for the associated chirp signal that is generated.

Chirp Receiver

Figure 5:
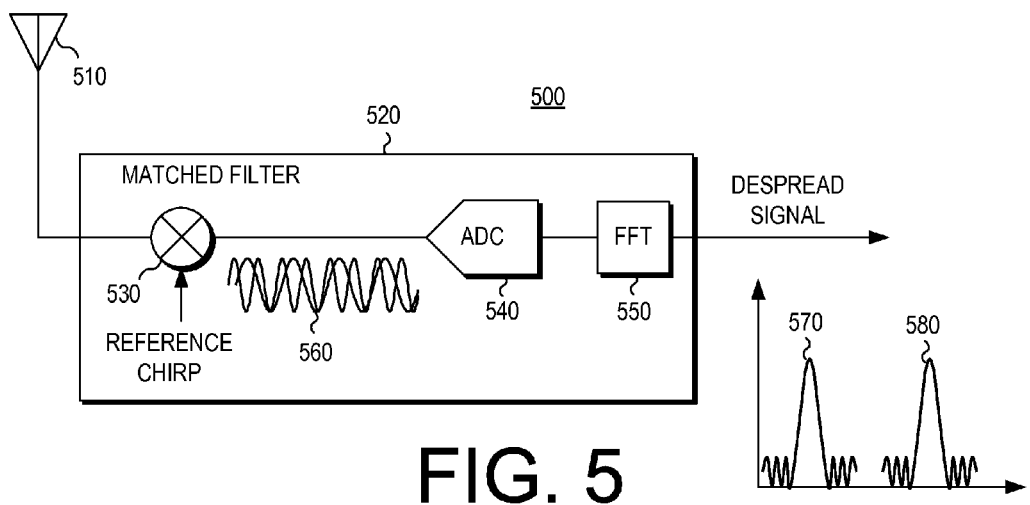
FIG. 5 is a block diagram of a chirp receiver according to disclosed embodiments.

FIG. 5 is a block diagram of a chirp receiver 500 according to disclosed embodiments. As shown in FIG. 5, the chirp receiver 500 includes an antenna 510 and an all-pass matched filter 520. The all-pass matched filter 520 can include a mixer 530, on analog-to-digital converter (ADC) 540, and a fast Fourier transform (FFT) circuit 550.

The antenna 510 receives an incoming signal that includes two orthogonal or nominally orthogonal chirp signals and provides it to the mixer 530 in the matched filter 520.

The mixer 530 mixes the incoming signal with a reference chirp to generate an analog mixed signal 560 that is provided to the ADC 540.

The ADC 540 converts the analog mixed signal 560 to a digital mixed-signal, which is then provided to the FFT circuit 550.

The FFT circuit 550 then performs a fast Fourier transform on the digital mixed-signal which results in a pair of short-duration despread signals 570, 580.

Thus, it is possible for the chirp receiver 500 to use the matched filter 520 to despread received overlapping chirp signals and converted into a short-duration pulse. Furthermore, different chirp signals with different ramp rates will be peace bread as short-duration pulses at different temporal positions from each other. As a result, it is possible for the chirp receiver 500 to receive an incoming signal with two or more orthogonal or nominally orthogonal chirp signals and extract them in a way that each can be successfully decoded. For example, if the short-duration pulses 570, 580 were modulated with data (using any desired modulation technique), it would be possible to extract both short-duration pulses 570, 580, and demodulate them to extract the data.

Stacked Chirp Signals

Just as it is possible to send two orthogonal or nominally orthogonal chirp signals at the same time, it is also possible to send more than two orthogonal or nominally orthogonal chirp signals. If enough orthogonal or nominally orthogonal chirp signals can be obtained, it is possible to send a large number at the same time (e.g., 4, 8, 16, 32, 64, etc.). These chirp signals can then be modulated to carry data. This transmission of multiple chirp signals at the same time can be called a stacked chirp signal.

Figure 6:
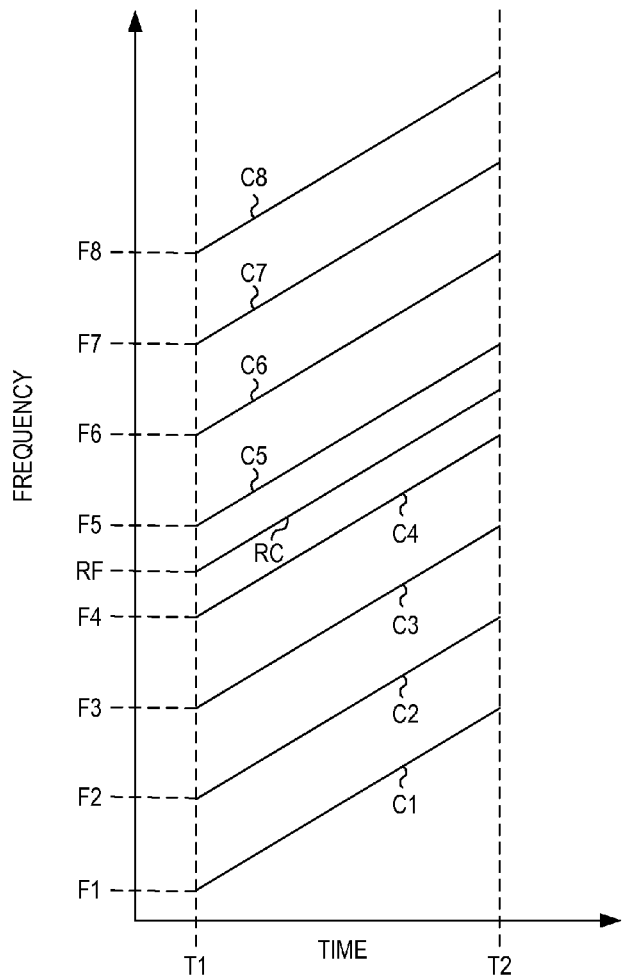
FIG. 6 is a graph of a stacked chirp signal in the frequency domain according to disclosed embodiments.

FIG. 6 is a graph of a stacked chirp signal in the frequency domain according to a disclosed embodiment. As shown in FIG. 6, eight data chirp signals C1, C2, C3, C4, C5, C6, C7, C8 are provided, along with a reference chirp signal RC. Each of the eight data chirp signals C1, C2, C3, C4, C5, C6, C7, C8 has the same ramp rate, but a different starting frequency F1, F2, F3, F4, F5, F6, F7, F8. Likewise, the reference chirp signal RC has a reference starting frequency RF. Each of the data chirp signals C1, C2, C3, C4, C5, C6, C7, C8 signals are chosen to be orthogonal or nominally orthogonal with respect to each other.

Although the embodiments of FIG. 6 disclose the use of eight chirp signals, this is by way of example only. Alternate embodiments could use fewer or more chirps overlapping signals.

Figure 7:
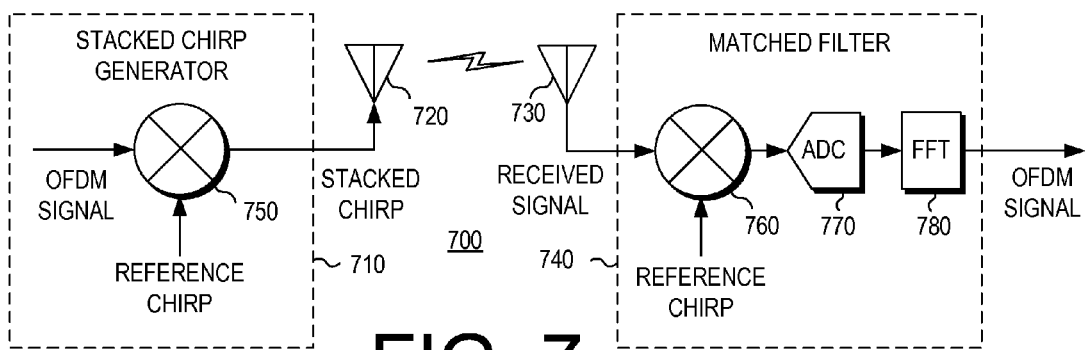
FIG. 7 is a block diagram of a chirp transmitter and receiver system according to disclosed embodiments.

It should be noted, however, that although chirp signals with the same linear ramp rates are shown in the disclosed embodiments, alternate embodiments could use different ramp rates for the chirp signals provided they resulted in orthogonal or nominally orthogonal chirp signals One way to generate the stacked chirp signal of FIG. 6 is shown in the transmission portion of the circuit of FIG. 7. In particular, FIG. 7 is a block diagram of a chirp transmitter and receiver system 700 according to disclosed embodiments. As shown in FIG. 7, the system 700 includes a stacked chirp generator 710 connected to a transmitter antennae 720, and a receiver antenna 730 connected to a matched filter 740. The stacked chirp generator includes a first mixer 750, while the matched filter 740 includes a second mixer 760, analog-to-digital converter (ADC) 770, and a fast Fourier transform (FFT) circuit 780.

The first mixer 750 in the stacked chirp generator 710 receives an OFDM signal and mixes it with the reference chirp signal RC. In this embodiment, the OFDM signal is shown in FIG. 8.

As shown in FIG. 8, the OFDM signal includes eight separate narrow-duration pulses 810, 820, 830, 840, 850, 860, 870, 880, each having a peak separated in time from the peaks of the other narrow-duration pulses, as well as from a reference time associated with the reference chirp signal RC.

When the OFDM signal of FIG. 8 is provided to the first mixer 750 and is mixed with the reference chirp signal RC, the results will be the stacked chirp signal disclosed in FIG. 6. This signal can then be transmitted over the air via the transmitter antenna 720 to the receiver antenna 730, where it will be provided to the matched filter 740.

Although not shown, this system could have a filter or an image reject mixer to select the upper or lower sideband output from the stacked chirp generator 710.

The matched filter 740 operates as the matched filter 520 in FIG. 5. In particular, the incoming stacked chirp signal is mixed with the reference chirp at the second mixer 760, is converted from analog to digital at the ADC 770, and is passed through the fast Fourier transform circuit 780. This results in the same OFDM signal that was originally mixed with the reference chirp signal RC in the stacked chirp generator 710.

In this way, an OFDM transmitter can be coupled with an OFDM receiver, but the underlying data can be sent using a stacked chirp transmission, with all of the advantages associated with that. For example, low power chirp signals can be used that can fall within class C operation. Likewise, such transmissions allow for multiple-input multiple-output (MIMO) operation. MIMO operation can be used to counteract multipath issues or to increase data rate.

However, despite the method of transmission, the data initially provided to the stacked chirp generator 710 and the data output from the matched filter 740 are OFDM signals. As a result, any circuitry that can be used to generate an OFDM signal can be used in the transmitter to provide the OFDM signal to the stacked chirp generator 710. Likewise, any circuitry that can be used to decode an OFDM signal can be used in the receiver to decode the output of the matched filter 740. In this way, the stacked chirp data transmission can be easily applied to existing devices.

One potential issue with this process, however, is that it can be difficult, or expensive, to operate a first mixer 750 at the speeds necessary to generate a stacked chirp signal. Therefore, an alternate design for the stacked chirp generator is provided.

Stacked Chirp Generator

Figure 9:
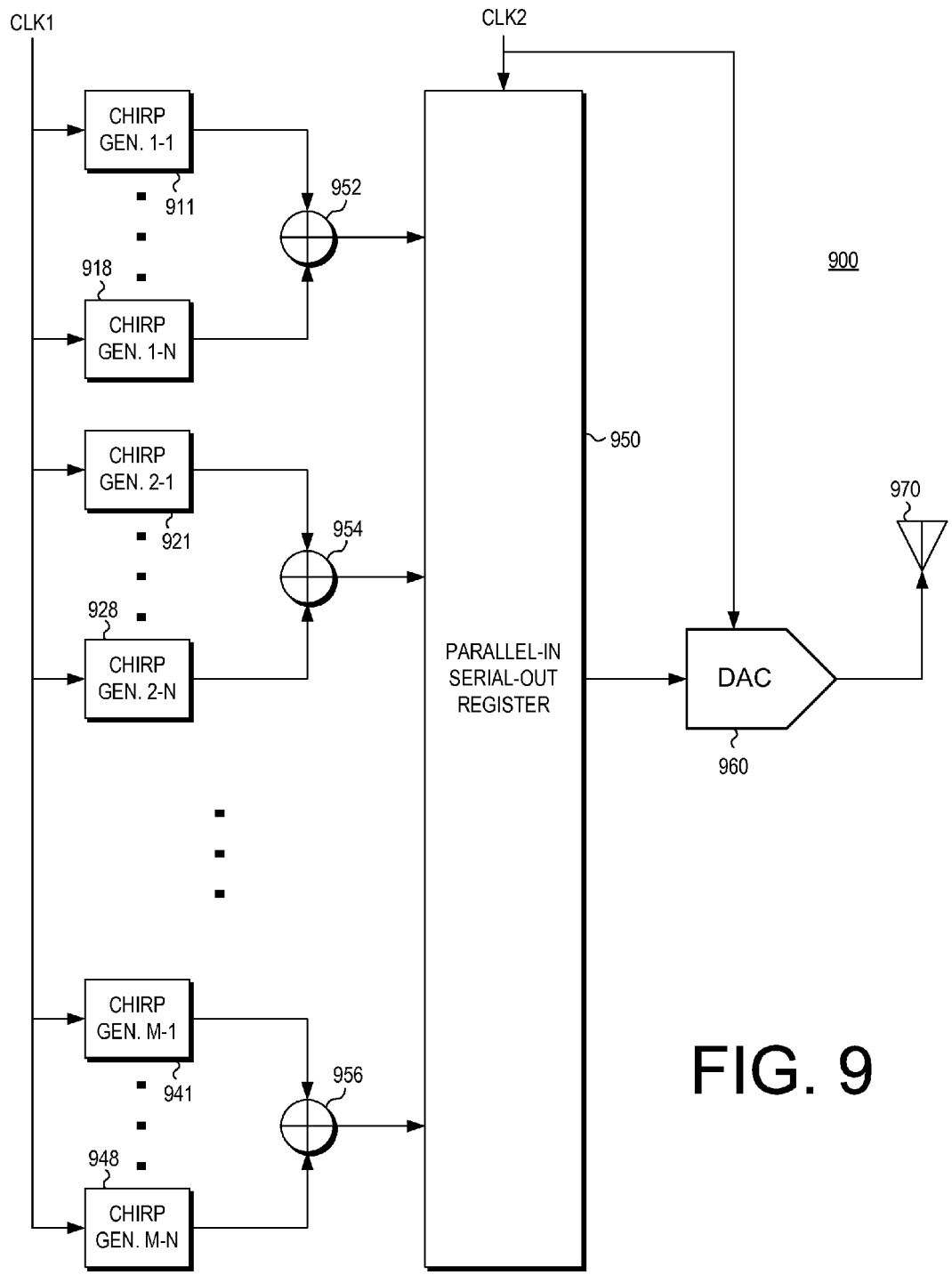
FIG. 9 is a block diagram of a chirp transmitter 900 for generating the stacked chirp signal of FIG. 6 according to disclosed embodiments.

FIG. 9 is a block diagram of a chirp transmitter 900 for generating the stacked chirp signal of FIG. 6 according to disclosed embodiments. As shown in FIG. 9, the chirp transmitter 900 includes every-M sample point generators 1-1 through 1-N 911, 918, every-M sample point generators is 2-1 through 2-8 921, 928, every-M sample point generators M-1 through M-8 941, 948, first through $M^{th}$ adders 952, 954, 956, a parallel-in serial-out register 950, a digital-to-analog converter (DAC) 960, and an antenna 970. N is an integer greater than 1.

Each of the a every-M sample point generators 1-1, 2-1, through M-1 911, 921, 941 receives a first clock signal CLK1 having a first clock frequency, and operates to generate samples for $(1/M)^{th}$ of a first digital chirp signal. Each every-M sample point generator 911, 921, 941 generates every $M^{th}$ sample in a digital chirp signal, each starting at a different start point. For example, in the disclosed embodiment the every-M sample point generator 1-1 911 generates samples 0, M, 2M, 3M, etc.; the every-M sample point generator 2-1 221 generates samples 1, M+1, 2M+1, 3M+1, etc.; an every-M sample point generator 3-1 would generate samples 2, M+2, 2M+2, 3M+2, etc.; up until the every-M sample point generator M-1 241 generates samples M-1, 2M-1, 3M-1, etc. In this way, all of the samples required to make a first digital chirp signal are generated by every-M sample point generators 1-1, 2-1, ..., M-1 211, 221, 241.

Likewise, each of the other (N-1) sets of every-M sample point generators (1-2, 2-2, ..., M-2, up until 1-N, 2-N, ... M-N) also generates the samples required to make respective second through $N^{th}$ digital chirp signals.

The every-M sample point generators 911, 918, 921, 928, 941, 948 also receive data to be modulated and modulate the respective chirp samples so as to properly modulate the resulting digital chirp signals with the data to be transmitted. This modulation can be binary phase shift keying (BPSK) modulation, quadrature phase shift keying (QPSK) modulation, quadrature amplitude modulation (QAM), or any desirable modulation scheme.

The first through $M^{th}$ adders 952, 954, 956 then add up active samples of the sets of N every-M sample point generators. For example, the first adder 952 adds up the samples 0, M, 2M, 3M, etc. for each of the first N every-M sample point generators 911, 918. Similarly, the second adder 954 adds up the samples 1, M+1, 2M+1, 3M+1, etc. for each of the second N every-M sample point generators 921, 928. This continues until the $M^{th}$ adder 956 adds up the samples M-1, 2M-1, 3M-1, etc. for each of the N $M^{th}$ every-M sample point generators 941, 948.

As noted previously, the every-M sample point generators 911, 918, 921, 928, 941, 948 can be implemented in a variety of ways. However, one way is to have each every-M sample point generator 911, 918, 921, 928, 941, 948 include a lookup table with the samples that make up their respective portion of the total chirp signal. The lookup table then operates based on the first clock signal CLK1 to output the contents of the associated lookup table at a frequency set by the first clock signal CLK1.

Alternate embodiments could have every-M sample point generators that operate to calculate the samples of the chirp signal transmitted, or have every-M sample point generators that include local oscillators that are sampled at appropriate times.

The parallel-in serial-out register 950 receives a second clock signal CLK2 having a second clock frequency, and operates to receive the outputs of the first through $M^{th}$ adders 952, 954, 956 in parallel at the first frequency, and output them in series at the second frequency. The output of the parallel-in serial-out register 950 is therefore a combination of the N complete digital chirp signals.

The DAC 960 also receives the second clock signal CLK2 and operates to take the digital chirp signal output from the parallel-in serial-out register 950 and convert it into an analog chirp signal.

The antenna 970 then operates to transmit the analog chirp signal.

Although not shown, this circuit can have additional back end processing between the DAC 960 and the antenna 970, prior to transmission In the embodiment shown in FIG. 9, the frequency of the second clock signal CLK2 must be at least M times the frequency of the first clock signal CLK1. For example, if M=16, the second clock signal CLK2 may operate at 4 GHz, while the first clock signal CLK1 may operate at 250 MHz. this allows the chirp generators 911, 918, 921, 928, 941, 948 to operate at a much lower speed allowing for the use of cheaper components that consume less power.

In addition, this configuration allows the combination of the eight overlapping chirp signals to be performed digitally at a low speed, rather than later on in the signal stream, where it would have to be done either at higher frequency or in the analog domain. This allows for a much cleaner operation and simplifies the transmitter design significantly.

It should also be noted that the samples provided by the chirp generators 911, 918, 921, 928, 941, 948 should nevertheless meet the Nyquist sampling rate for the associated chirp signal that is generated.

Method of Generating Static Chirp Signal

FIG. 10 is a flow chart of a method 1000 of generating overlapping chirp signals according to disclosed embodiments. As shown in FIG. 10, the method 1000 begins by generating a first chirp signal (1010), and then generating a second chirp signal (1020). These two chirp signals should be orthogonal or nominally orthogonal.

The first chirp signal and the second chirp signal are then transmitted as added (i.e., overlapping or interleaved) first and second chirp signals (1030). This can be achieved by the circuits shown in FIG. 4 or FIG. 9, or variations thereof. For example, two copies of the circuit in FIG. 4 could be tied to the same antenna. Alternatively, the parallel-in serial-out registers 450 in two circuits as shown in FIG. 4 could be connected to an adder prior to being sent to a single DAC 460.

FIG. 11 is a method of generating a chirp signal 1010, 1020 according to disclosed embodiments. As shown in FIG. 11, the method 1010, 1020 begins by generating M digital chip sample portions in parallel at a first frequency (1110), and then outputting the M digital chirp sample portions in series as a digital chirp portion at a second frequency that is M times the first frequency (1120).

The digital chirp portion is then converted into an analog chirp portion (1130), and the resulting analog chirp portion is transmitted (1140).

Then, it is determined whether this process has been performed P times, where P is the number of chirp portions that make up a complete chirp (1150). If no, the system advances to the next set of sample points (1160) and repeats the process. If yes, the system waits until the next chirp needs to be transmitted (1170).

FIG. 12 is a flow chart of a method 1200 of generating overlapping or interleaved chirp signals according to alternate disclosed embodiments. As shown in FIG. 12, the method 1200 begins by generating M first digital chip portions in parallel at a first frequency (1210) and generating M second digital chirp portions in parallel at the first frequency (1220).

The first and second digital chip portions are then added together to get M combined digital chip portions (1230). These M combined digital chip portions are then output in series as a combined digital chirp portion at a second frequency that is M times the first frequency (1240).

The digital chirp portion is then converted into an analog chirp portion (1250), and the resulting analog chirp is transmitted (1260).

Then, it is determined whether this process has been performed P times, where P is the number of chirp portions that make up a complete chirp (1270). If no, the system advances to the next set of sample points (1280) and repeats the process. If yes, the system waits until the next chirp needs to be transmitted (1290).

Method of Receiving Overlapping Chirp Signals

FIG. 13 is a flow chart of a method 1300 of receiving overlapping chirp signals according to disclosed embodiments. As shown in FIG. 13, the method 1300 begins by receiving an incoming signal (1310).

Then the method generates a reference chirp signal having a set start frequency and a set ramp rate (1320).

The reference chirp is then mixed with the incoming signal to generate an analog mixed signal (1330).

The analog mixed signal is then converted from analog to digital, becoming a digital mixed signal (1340).

A fast Fourier transform is then performed on the digital mixed-signal to generate a despread signal and (1350). This despread signal will contain multiple short-duration pulses separated in time with respect to a reference time corresponding to the reference chirp.

Conclusion

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. An electromagnetic transmission system, comprising:

M first chirp generators, each operating at a first frequency, each of the M first chirp generators being configured to generate P first digital chirp sample points comprising $(1/M)^{th}$ of a first digital chirp signal having a first ramp rate;

M second chirp generators, each operating at the first frequency, each of the M second chirp generators being configured to generate P second digital chirp sample points comprising $(1/M)^{th}$ of a second digital chirp signal having a second ramp rate;

M adders, each configured to add the P first digital chirp sample points to the P second digital chirp sample points, respectively, to generate P combined digital chirp sample points;

a parallel-in serial-out register configured to receive the P combined digital chirp sample points in parallel at the first frequency, and configured to output the P combined digital chirp sample points in series as $(1/M)^{th}$ of the digital chirp signal at a second frequency; and a digital-to-analog converter operating at the second frequency and configured to convert the digital chirp signal into an analog chirp signal, wherein M and P are integers greater than 1, wherein the second frequency is at least M times the first frequency, and wherein the second ramp rate is different from the first ramp rate.

2. The electromagnetic transmission system of claim 1, further comprising:

an antenna configured to transmit the analog chirp signal.

3. The electromagnetic transmission system of claim 1, wherein the chirp signal is modulated with data.

4. The electromagnetic transmission system of claim 3, wherein the modulation is one of BPSK, QPSK, or QAM encoding.

5. An electromagnetic transmission system, comprising:

M first chirp generators, each operating at a first frequency, each of the M first chirp generators being configured to generate an $i^{th}$ first digital chirp portion comprising $(1/M)^{th}$ of a first digital chirp signal having a first ramp rate and a first starting frequency;

M second chirp generators, each operating at the first frequency, each of the M second chirp generators being configured to generate an $i^{th}$ second digital chirp portion comprising $(1/M)^{th}$ of a second digital chirp signal having a second ramp rate and a second starting frequency;

M adders, each configured to add the $i^{th}$ first digital chirp portion to the $i^{th}$ second digital chirp portion to generate an $i^{th}$ combined digital chirp portion;

a parallel-in serial-out register configured to receive the M combined digital chirp portions in parallel at the first frequency, and configured to output the M combined digital chirp portions in series as a combined digital chirp portion signal at a second frequency; and a digital-to-analog converter operating at the second frequency and configured to convert the combined digital chirp signal portion into a combined analog chirp signal portion, wherein M is an integer greater than 1, wherein i is an index that goes from 1 to M, wherein the second frequency is M times the first frequency, wherein the first chirp signal and the second chirp signal are orthogonal or nominally orthogonal, and wherein the second ramp rate is different from the first ramp rate.

6. The electromagnetic transmission system of claim 5, wherein the second starting frequency is different from the first starting frequency.

7. The electromagnetic transmission system of claim 5, further comprising:
an antenna configured to transmit the combined analog chirp signal portion.

8. The electromagnetic transmission system of claim 5, wherein
the first chirp signal is modulated with first data, and
the second chirp signal is modulated with second data.

9. The electromagnetic transmission system of claim 8, wherein
the first and second chirp signals are modulated using one of BPSK, QPSK, or QAM encoding.

10. A method of generating an electromagnetic signal, comprising:
generating M first digital chirp portions at a first frequency, each of the M first digital chirp portions comprising P sample points that make up $(1/M)^{th}$ of a first digital chirp signal having a first ramp rate and a first starting frequency;
generating M second digital chirp portions at the first frequency, each of the M second digital chirp portions comprising P sample points that make up $(1/M)^{th}$ of a second digital chirp signal having a second ramp rate and a second starting frequency;
adding corresponding first digital chirp portions to corresponding second digital chirp portions to generate M combined digital chirp portions at the first frequency;
outputting the M combined digital chirp portions in series as a combined digital chirp signal portion at a second frequency; and
converting the combined digital chirp signal portion into a combined analog chirp signal portion,
wherein P and M are integers greater than 1,
wherein the second frequency is M times the first frequency,
wherein the first chirp signal and the second chirp signal are orthogonal or nominally orthogonal, and
wherein the second ramp rate is different from the first ramp rate.

11. The electromagnetic transmission system of claim 10, wherein the second starting frequency is different from the first starting frequency.

12. The method of claim 10, further comprising:
modulating the first chirp signal with first data, and
modulating the second chirp signal with second data.

13. The method of claim 12, wherein
the first and second chirp signals are modulated using one of BPSK, QPSK, or QAM encoding.

\* \* \* \* \*